United States Patent Office 2,799,457
Patented July 16, 1957

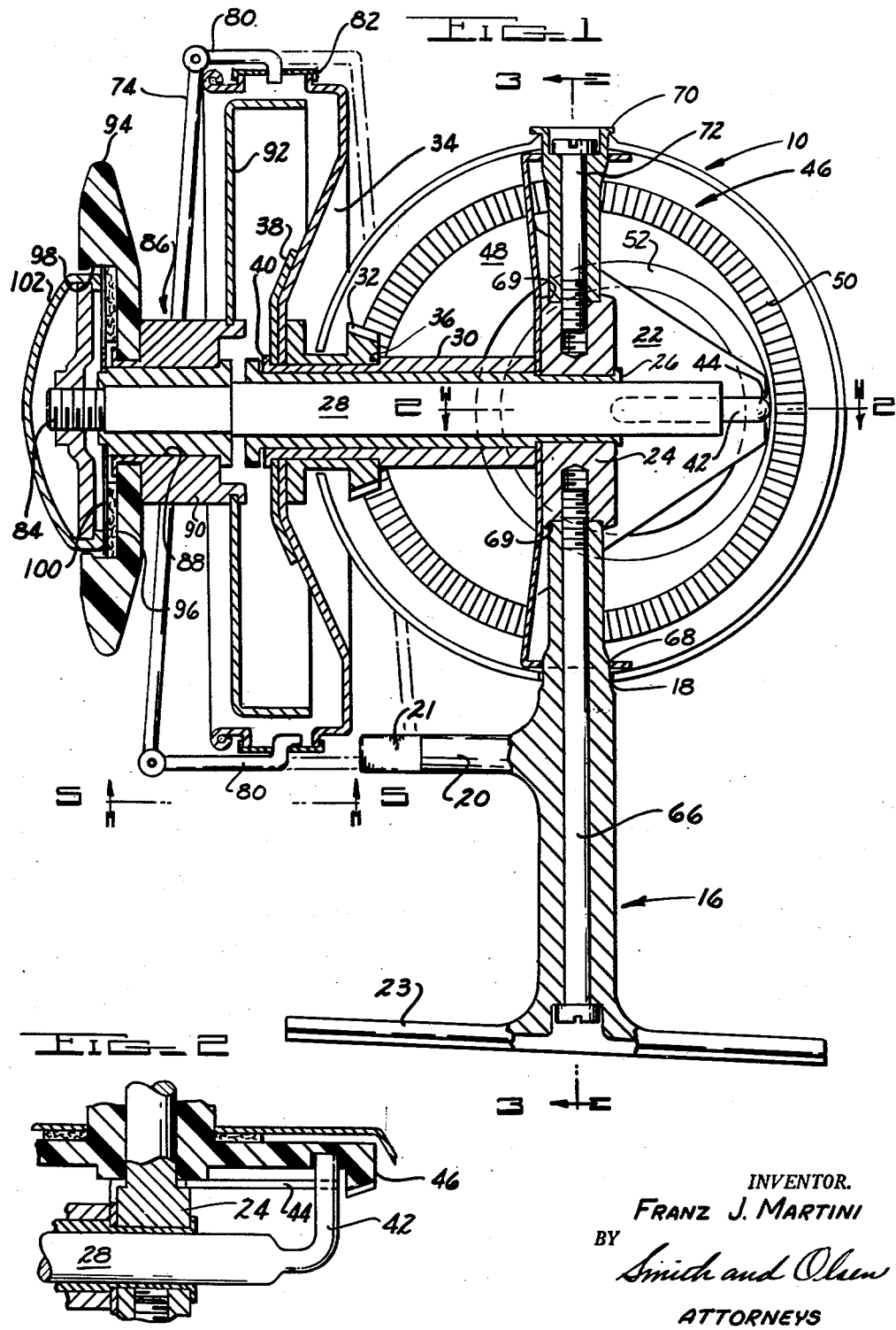

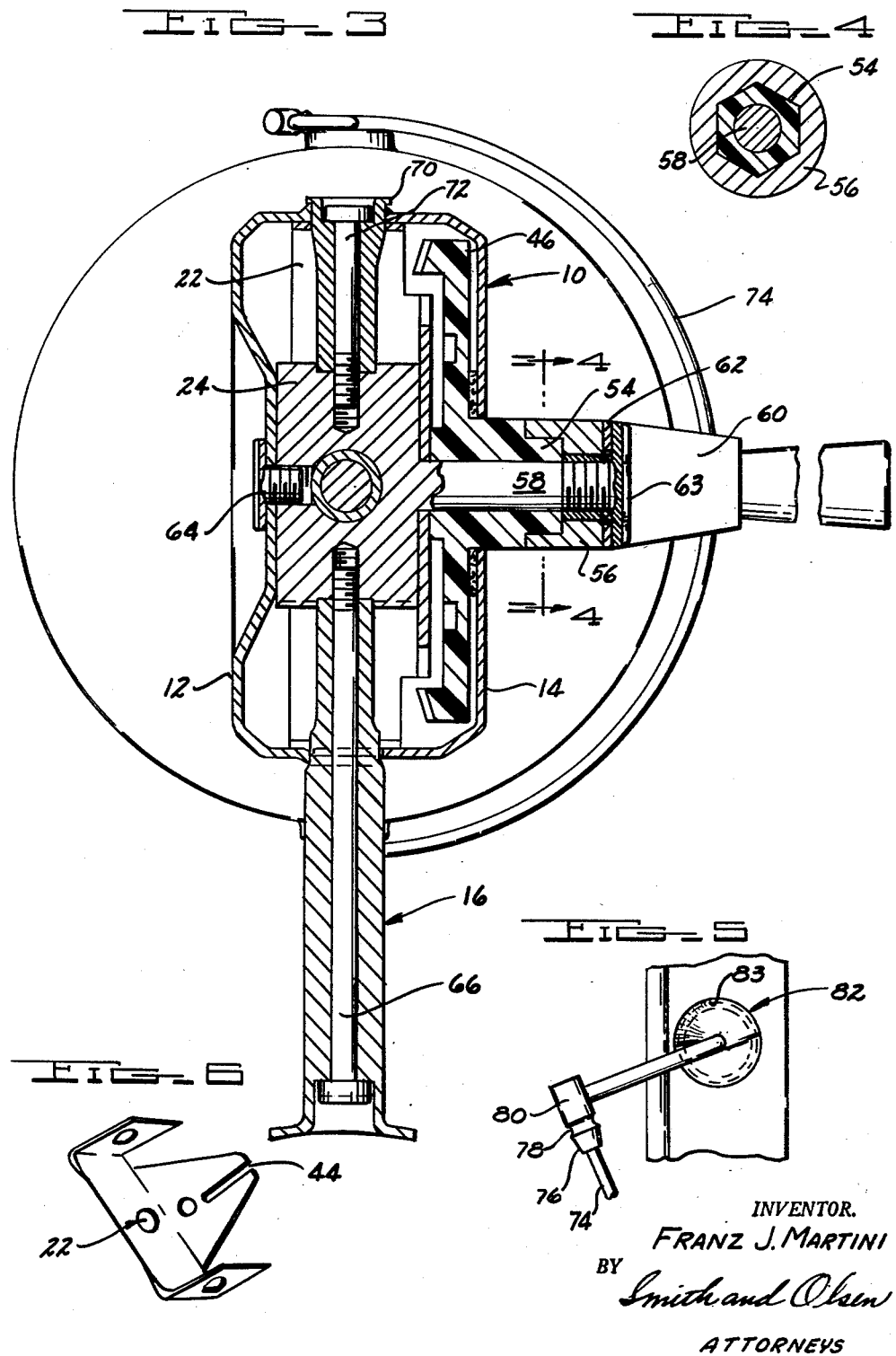

2,799,457

SPINNING TYPE FISHING REEL

Franz J. Martini, Detroit, Mich.

Application August 19, 1953, Serial No. 375,132

5 Claims. (Cl. 242—84.21)

The present invention relates to improvements in a spinning type fishing reel. This application is a continuation-in-part of my copending application, Serial No. 182,249, filed August 30, 1950, and now issued as Patent No. 2,712,419.

Spinning reels differ from conventional rotary spool casting reels in that the spool is nonrotatable and reciprocates about a longitudinal axis which extends substantially parallel to the longitudinal axis of the casting rod. During the casting operation, the line is stripped or spun off the end of the nonrotatable spool. When retrieving the line, a flier concentric with the spool rotates around the spool and carries a line-winding member which engages the line and guides it around the spool. The line-winding member is adapted to be disengaged during the casting operation.

It is desirable to make spinning reels adaptable for either right or left hand operation in order to reduce manufacturing costs and eliminate the necessity for making two different types of reels. It not only is desirable to make the reel versatile in this respect but also to make the reel as simple as possible in order to render manufacture and assembly rapid and inexpensive. In this manner the reel may be sold to the retail customers at a low price.

One of the difficulties with previous spinning reel constructions is that the line winding bail usually is provided with a sharp bend which is adapted to seat the line as the line is reeled in about the spool after a cast is completed. This sharp bend has a tendency to wear the line, especially since it is not uncommon to use light lines such as six pound test with a spinning reel outfit.

Therefore, it is a principal object of the present invention to provide a spinning reel assembly which may simply and rapidly be changed from left to right hand operation or vice versa without interfering with the operating parts of the reel.

It is a further object of the present invention to provide a spinning reel assembly including a line winding member which properly guides the line as it is wound onto the spool without causing excessive wear on the line.

It is another object of the present invention to provide a spinning reel assembly which is simple in construction, relatively inexpensive to manufacture, and which includes a minimum number of parts that coact to render efficient operation.

Other objects of this invention will appear in the following description and appended claims, reference being had to the accompanying drawings forming a part of this specification wherein like reference characters designate corresponding parts in the several views.

In the drawings:

Fig. 1 is a sectional side elevation of a spinning reel embodying the present invention with the spool in the retracted position, and showing the operative parts in position for right hand casting and left hand winding.

Fig. 2 is a fragmentary section taken along the line 2—2 in the direction of the arrows, Fig. 1, and particularly showing the construction of the cam follower.

Fig. 3 is a sectional rear elevation taken along the line 3—3 in the direction of the arrows, Fig. 1.

Fig. 4 is a sectional view taken along the line 4—4 in the direction of the arrows, Fig. 3.

Fig. 5 is a fragmentary view of a portion of the flier and bail showing the manner of attachment of the bail to the flier, and taken along the line 5—5 in the direction of the arrows, Fig. 1.

Fig. 6 is a perspective view of the support bracket of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, the numeral 10 (Fig. 3) indicates the housing which is formed of complemental lightweight metal stampings 12 and 14, each forming half of the completed housing. Figs. 1 and 3 show the reel in an upright position but in use the reel will ordinarily be disposed beneath the casting rod.

A unitary reel post 16 extends upward into the housing 10 through an opening 18 therein. The reel post is formed of a single piece cast aluminum alloy and includes the integral bail-tripping finger 20 having a cam face 21 on each side thereof. The reel post 16 also includes the seating base 23 which is adapted for disposition in the reel seat of a casting rod. Disposed between the stampings 12 and 14 is a support bracket 22 (shown in detail in Fig. 6). A fastening head 24 is placed flush against the forward face of the bracket 22 (Fig. 1). The fastening head has a central hole through its longitudinal axis and screw threaded holes placed one on the top, bottom, and one side thereof. Head 24 serves as the central locating member for shaft 28, bracket 22, gear 46, and crank 60.

Referring to Fig. 1, it will be noted that a sleeve 26 extends through the longitudinal hole in the head 24 and provides a bearing surface for the central shaft 28 which is adapted for reciprocating movement therein. Disposed concentrically around the sleeve 26 is a second sleeve 30 onto which is pressed a bevel gear 32. The bevel gear 32 is rigidly affixed to a cup-shaped flier 34 by the shoulder 36 on the sleeve 30, the retainer 38, and the flange 40 on the end of sleeve 30. Thus, when the bevel gear 32 is rotated, the flier 34 also rotates.

A cam follower 42 is formed on the rearward end of the shaft 28 and extends at substantially a right angle thereto. The cam follower 42 is disposed within the groove 44 of the supporting bracket 22.

An integral nylon main drive gear 46 is provided which consists of a central disc 48 surrounded by a peripheral gear portion 50. The disc 48 has an eccentric cam groove 52 formed therein. Referring to Fig. 1 of the drawings, it will be seen that as the main drive gear 46 is rotated, the shaft 28 will reciprocate within the sleeve 26. The gear portion 50 engages the bevel gear 32 and as the main drive gear 46 is rotated, the bevel gear 32 and flier 34 which is affixed thereto, are also rotated. Thus, when the main drive gear 46 is rotated, the flier 34 is rotated and the shaft 28 is simultaneously reciprocated.

Fig. 3 discloses the drive gear crank unit of the present invention. The nylon drive gear 46 includes the polygonal hub 54 which extends into a polygonal opening in the crank spacer 56. A shaft 58, formed as an integral part of the head 24, extends through the side of the bracket 22, the main drive gear 46, the crank spacer 56, a washer 62, and the crank 60. A cap nut 63 is threaded onto the end of shaft 58 to hold the crank assembly in place. It will be seen that a pin 64 is disposed through the opening in the stamping 12 and is screwed into the side hole in the fastening head 24.

The reel post 16 has a central hole running through the upright and as shown in Fig. 1, a long bolt 66 is inserted into the central hole. The reel post 16 extends into the housing 10 through the hole 18 and through the hole 68 in the bracket 22. The bolt 66 extends into screw threaded engagement with the hole in the bottom of the fastening head 24 and a locating depression 69 is formed in the head 24 to seat the end of the reel post 16. A retainer 70 fits through complemental slots in the stampings 12 and 14 and a second and shorter bolt 72 extends through the retainer and is threaded into the hole in the top of the fastening head 24.

In order to reverse the operation from that of left hand winding to right hand winding, it is merely necessary to unscrew the bolt 66 and remove the bolt and the reel post 16 from the reel assembly, unscrew the bolt 72 and remove the bolt and retainer 70 from the reel assembly. The two bolts are then placed in reversed positions, and the reel is ready for right hand winding. It is not necessary to interfere with the working parts or the interior of the reel mechanism.

A novel line engaging bail is provided with the construction shown in the drawings. This bail includes a U-shaped bail wire 74. Each end of the U-shaped bail wire 74 is extended through a guide sleeve 76, a Carboloy or hard metal roller 78 and an attaching bracket 80. The attaching bracket extends through a central hole in the cap 82, and the end of the bail wire 74 is welded to the attaching bracket. The cap 82 has a tapered cam face 83 which facilitates movement of the bracket 80 from the casting to the line-engaging position.

There is no chance of the bail wire snapping out of the reel assembly as is the case with conventional bail constructions. This construction also simplifies the formation of the bail wire since the critical parts are formed by metal stampings, and the wire is a simple open end U-shaped member. Further, line wear is reduced due to the provision of the roller 78 which eliminates sharp surfaces. The roller 78 may or may not actually rotate since the roller configuration will properly guide the line with respect to the spool in either instance.

Referring to Fig. 1, the forward end of the shaft 28 is screw threaded at 84. Disposed over the forward portion of the shaft 28 is the spool assembly 86 which comprises the bearing 88, the spool core 90 disposed around the bearing 88, the rearward spool cap 92 affixed to the spool core 90, and the forward spool cap 94 affixed to the core 90. The spool assembly 86 is placed over the forward portion of the shaft 28 and a felt friction disc 96 is placed within the depression 98 formed in the face of the forward spool cap 94. A metallic spring disc 100 is then placed against the friction disc 96, and a cap nut 102 is screw threaded onto the end 84 of the shaft 28. The inner portions of the cap nut 102 bear against the metal disc 100, which in turn bears against the felt disc 96, and seats on bearing 88 to exert adjustable pressure against the forward spool cap 94. Thus, the spool may be adjusted to rotate when sufficient force is exerted on the line which is attached to the spool.

In use, the reel post 16 is attached to a fishing rod, with the base portion 23 in the reel seat portion of the rod on the under side of the rod. The bail wire 74 is moved to the inoperative position as shown in phantom, Fig. 1. The lure is then cast out and the line is whirled or spun about an axis, which is generally coincident with the axis of the stationary spool 86. Due to the centrifugal force acting on the line, the orbit described by the spinning line is larger than the circumference of the end cap 94 of the stationary spool 86.

When it is desired to retrieve the lure, the crank 60 is rotated to effect rotation of the flier 34 and reciprocation of the shaft 28. When the flier 34 is rotated, the bail wire 74 is forced along the cam face 21 of the cam finger 20 and is flipped over in a 180 degree arc to the solid line position in Fig. 1. During this operation, the bail wire 74 passes over the front spool cap 94 and the line is guided up over the guide sleeve 76 onto the roller 78 of the bail construction. As the crank 60 is further rotated, the flier 34 and bail wire 74 are rotated about the spool 86. The shaft 28, which is affixed to the core 90 of the spool is simultaneously reciprocated to provide a uniform winding of the line across the length of the spool.

The improved spinning reel construction of the present invention is simple, efficient, and relatively inexpensive to manufacture. It is quickly and easily changeable from left to right hand winding or vice versa. The casting line is subjected to minimum wear.

Having thus described my invention, I claim:

1. In a spinning type casting reel, a housing formed of complemental stampings, a line-carrying spool adjacent said housing, a reciprocating spindle affixed to said spool and extending within said housing, a rotatable flier surrounding said spool and having a line-engaging member pivotally mounted thereon, a substantially C-shaped bracket having a back portion with an upper and lower leg extending outwardly therefrom, an integral side plate extending outwardly from the back of said bracket and having a groove formed therein, holes being formed in the back, side plate, bottom, and top of said bracket, and a fastening head affixed adjacent the back of said bracket and having a longitudinal opening through the center thereof aligned with the hole in the back of the bracket, said head having holes formed in the top, bottom and one side thereof, said reciprocating spindle being disposed through the longitudinal hole in said fastening head and having a cam follower on the end opposite the line-carrying spool, said cam follower extending through the groove in said bracket side plate, a crank drive gear assembly disposed on one side of said fastening head and affixed thereto through one of said complemental housing stampings and the side plate of said bracket, said drive gear having an eccentric cam groove therein which seats the said cam follower, a pin disposed in screw threaded engagement with the side hole in said head to extend through the other complemental housing stamping, a reel post having one end extending into the hole in the bottom of said head and affixed to said head, and a retaining pin in screw threaded engagement with the hole in the top of said head, said reel being adapted for changing the winding operation merely by reversing the reel post and the retaining pin.

2. In a spinning type casting reel, a housing; a line-carrying spool adjacent said housing; a reciprocating spindle affixed to said spool and extending within said housing; a rotatable flier surrounding said spool and having a line-engaging member pivotally mounted thereon; an operating crank; driving means operatively connected with said crank, spindle, and flier to effect the simultaneous reciprocation of said spindle and rotation of said flier upon actuation of said crank; a locating member disposed within said housing for guiding said reciprocating spindle and locating said operating crank and driving means in proper position; a supporting bracket affixed to said locating member and contacting said housing to position and support the same; seating means on the top and bottom of said locating member; a reel post having one end disposed in one of said seating means, said reel post having a cam finger thereon adapted to trip said line-engaging member; and a fastener affixed in the other of said seating means to fasten said housing to said locating member, the winding operation of the reel being changed merely by reversing the reel post and the fastener to opposite seating means in the locating member without disassembling the housing.

3. In a spinning type casting reel, a housing having openings in the top and bottom thereof; a line-carrying spool adjacent said housing; a reciprocating spindle affixed to said spool and extending within said housing; a rotatable flier surrounding said spool and having a line-engaging member pivotally mounted thereon; an operating crank; driving means operatively connected with said crank, spindle, and flier to effect the simultaneous reciprocation of said spindle and rotation of said flier upon actuation of said crank; a bracket disposed within said housing and having engaging portions in contact with the top and bottom of said housing with holes therethrough, a locating head affixed to the central portion of said bracket for guiding said reciprocating spindle and locating said operating crank and driving means in proper position, said locating head having a threaded hole in the top and a threaded hole in the bottom thereof; a hollow reel post having one end disposed through the engaging position of said bracket in contact with said locating head and also having a cam finger thereon adapted to trip said line-engaging member; a bolt extending through said hollow reel post in threaded engagement with one of the holes in said locating head; and a cap screw extending through the other engaging portion of said bracket in the other screw-threaded hole in said locating head to fasten said housing to said locating head, the winding operation of said reel being changed by reversing the reel post and cap screw to opposite threaded openings in said locating head without disassembling the housing.

4. In a spinning type casting reel, a housing; a line-carrying spool adjacent said housing; a reciprocating spindle affixed at one end to said spool; a cam follower on the other end of said spindle which is disposed in said housing, a rotatable flier surrounding said spool and having a line-engaging member pivotally mounted thereon; a locating head disposed within said housing and seating said reciprocating spindle, said head having threaded holes formed in the top and bottom thereof; guide means positioned adjacent said head for guiding said cam follower in its lineal movement; a rotatable crankdrive gear assembly disposed on one side of said locating head and affixed thereto through said housing, said drive gear having an eccentric cam groove therein which seats the said cam follower to actuate the same as said crank is rotated; a hollow reel post having one end engaged with the bottom of said head; a threaded fastening pin extending through said hollow reel post and extending into the threaded hole in the bottom of said head to fasten said post to said head; the winding operation of said reel being changed solely by repositioning the reel post in engagement with the top of the head and extending the fastening pin through the post into the hole in the top of the head.

5. A spinning type casting reel comprising a head member having a through bore; a bracket having a slotted wall extending along one face of said head member and an angularly turned wall extending along an adjacent face of said head member; a hole in said angularly turned wall in registry with the bore; a spindle extending through the hole and bore; a spool carried by one end of said spindle; a cam follower carried by the other end of said spindle and extending through the slot in the bracket; and a disk rotatably supported by said head member; said disk having an eccentric cam surface seating said cam follower; whereby rotation of said disk is translated into reciprocation of said spool.

References Cited in the file of this patent

UNITED STATES PATENTS

| | | |
|---|---|---|
| 2,314,616 | Gaire | Mar. 23, 1943 |
| 2,498,987 | Duncan | Feb. 28, 1950 |
| 2,538,153 | Guthrie | Jan. 16, 1951 |
| 2,546,465 | Martini | Mar. 27, 1951 |
| 2,649,257 | Shelburne | Aug. 18, 1953 |

FOREIGN PATENTS

| | | |
|---|---|---|
| 252,487 | Switzerland | Mar. 16, 1949 |
| 426,735 | Italy | Nov. 6, 1947 |
| 455,246 | Canada | Mar. 22, 1949 |
| 577,244 | Great Britain | May 10, 1946 |
| 819,539 | France | July 12, 1937 |
| 919,747 | France | Dec. 9, 1946 |
| 1,020,118 | France | Nov. 12, 1952 |

OTHER REFERENCES

"Product Engineering," November 1950, page 229.